Aug. 9, 1966  R. W. KAECHELE  3,265,003

PUMP

Filed April 2, 1964

INVENTOR
ROBERT W. KAECHELE

BY Dodge and Som

ATTORNEYS 3,265,003
PUMP
Robert W. Kaechele, Kalamazoo, Mich., assignor to The New York Air Brake Company, a corporation of New Jersey
Filed Apr. 2, 1964, Ser. No. 356,881
4 Claims. (Cl. 103—126)

This invention relates to gear pumps. Particularly, it relates to a novel seal whereby leakage from the impeller cavity along the shafts is minimized. The use of a high pressure seal where the drive shaft emerges from the housing is thus eliminated, though a low pressure seal still will be used at this location.

Essentially, the invention comprises an annular seal plate which encircles the shaft and is resiliently biased into initial sealing engagement with the side face of the gears. The outer periphery of the seal plate lies entirely within the trace of the roots of the gear teeth. In addition to the resilient bias already mentioned, the seal plate is subjected over its gear-engaging sealing face to the graduated pressure exerted by leakage fluid passing between these faces. On its opposite face, it is subjected, over a portion of its area, to pressure of fluid from the high pressure end of the leakage path. The resultant of these pressure forces acts to maintain the desired sealing engagement between the seal plate and the side faces of the gears.

The invention will be described having reference to the accompanying drawing in which FIG. 1 is an axial sectional view of a pump embodying the invention.

Figure 1:
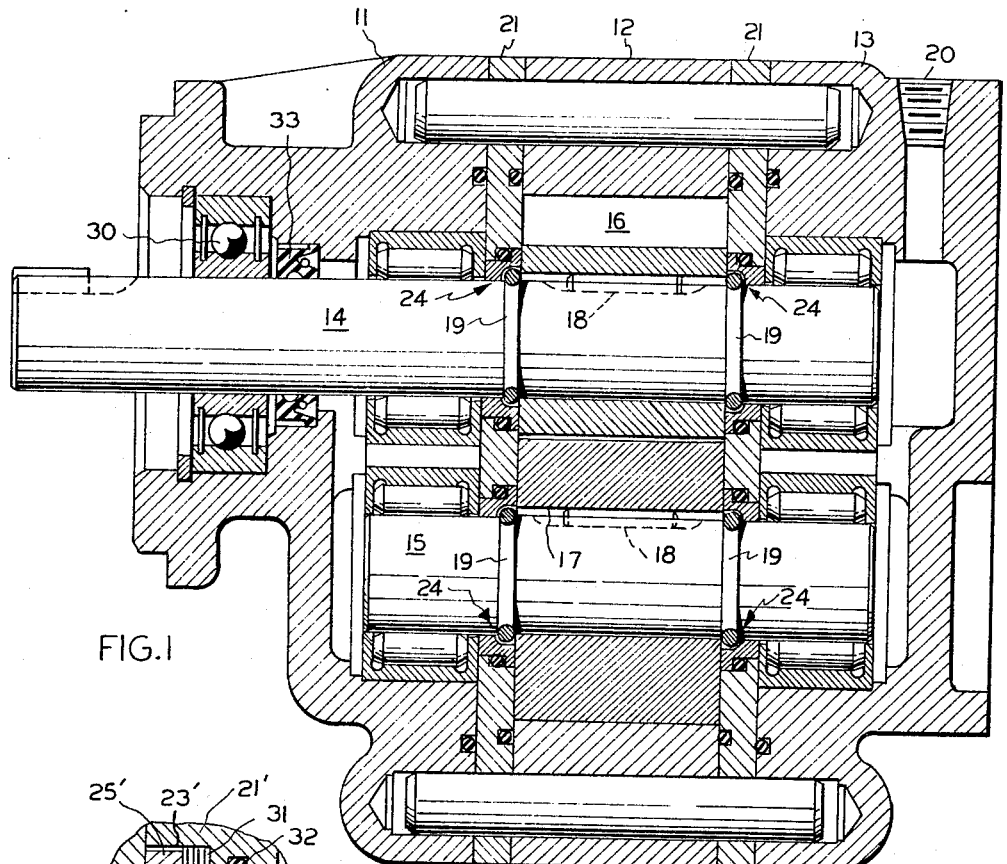

Refer first to FIG. 1. The pump comprises a three-part housing consisting of an adapter section 11, a central section 12 and an end cover 13. A drive shaft 14 is journalled, as shown, in roller bearings mounted in adapter section 11 and end cover 13. An idler shaft 15 parallel with shaft 14 is similarly journalled in the pump housing. Inter-engaging gear impellers 16 and 17, one carried by each of shafts 14 and 15, are mounted for rotation in an impeller cavity formed in central section 12 of the housing. The gears are keyed to shafts 14 and 15 by keys 18 as shown and are confined against longitudinal movement by snap rings 19. A wear plate 21 is confined between the opposite side faces of the central section 12 and the adapter 11 and cover 13.

The outer end of the drive shaft 14 is supported by a ball bearing 30. A low pressure seal 33 prevents leakage of fluid outward along shaft 14. The interior portion of the housing has a drain 20 formed in end cover 13. Fluid may pass along shafts 14 and 15 between the interior portions of the housing. The end cover 13 and the corresponding wear plate 21 are provided with suitable inlet and outlet connections to and from the impeller cavity. These connections are not illustrated.

Figure 2:
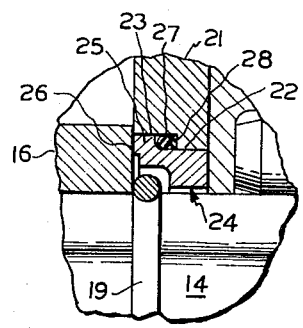
FIG. 2 is a fragmentary, axial sectional view showing details of the form of seal plate used in FIG. 1.

As best shown in FIG. 2, shaft 14 projects outward through an opening 22 in the wear plate 21. This opening 22 has a counterbore 23 extending into it from its gear-engaging face. An annular seal plate 24 is received in the opening 22 and its counterbore 23. As shown, this seal plate 24 comprises an annular cylindrical body provided with a flange 25. A radial sealing face 26 is formed on the end surface of flange 25 and engages the side face of gear 16 (or 17). An O-ring 27 encircles the smaller diameter portion of plate 24. A back-up ring 28 is provided between O-ring 27 and the bottom of counterbore 23. As shown, the inner axial surface of the plate 24 fits loosely on shaft 14, a relatively large clearance being provided. The corner of seal plate 24 adjacent ring 19 is cut away as shown.

Figure 3:
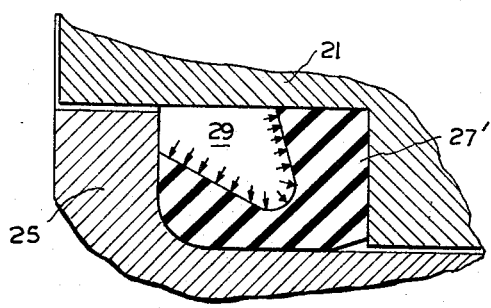

As shown in FIG. 3, the sealing ring 27 can have a cross section other than circular. The ring 27' has a form similar to the shape of the annular space defined between ring 24 and opening 22 except in the region where leakage fluid enters. Here, the ring 27' is provided with a generally V-shaped circumferential groove 29.

Figure 4:
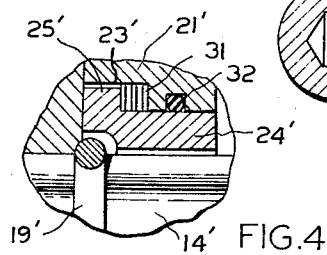
FIGS. 3 and 4 are views, similar to FIG. 2, but showing modified forms of the seal plate.

According to FIG. 4, the seal plate 24' may be provided with a spring 31 reacting between flange 25' and the bottom of counterbore 23'. A sealing ring 32 is mounted in a groove formed in wear plate 21' and reacts against the smaller diameter portion of the seal plate 24'.

*Operation*

The seal plate 24, in all of the illustrated embodiments serves to inhibit the passage of leakage fluid from the impeller cavity radially inward along the side faces of the gears. Such leakage fluid is at substantially pump discharge pressure. As the leakage fluid passes along the side faces of the gears it divides when it reaches the periphery of conuterbore 23. Part continues along the gear face and between that face and the sealing face 26 of flange 25. The other portion of the leakage fluid enters counterbore 23 from which it cannot escape, because of seal ring 27 (27' or 32). This fluid acts on the inner radial face of flange 25 and urges the seal plate 24 into sealing engagement with the side face of the gear. Initial sealing engagement between the seal plate and the gear is assured by the spring 31 of the FIG. 4 embodiment and by the fact that sealing rings 27 and 27' of the FIG. 2 and FIG. 3 embodiments are axially compressed on assembly of the pump. The radial dimensions of the sealing face 26 and of the inner radial face of flange 25 are selected to produce a resultant force on the seal plate 24 sufficient to produce sealing contact with the side face of the gears. The radial dimension of the inner surface of flange 25 can be markedly less than that of face 26, since a sharp pressure gradient will exist across this latter face.

The rings 27, 27' and 32 will normally hold the plate 24 against rotation. If desired suitable positive means can be provided.

While the invention has been described in considerable detail, no limitation to these precise forms is intended except as may be expressed in the appended claims.

What I claim is:

1. In a gear pump of the type including a housing having an impeller cavity therein, inter-engaging toothed impellers in said cavity; a wear plate closing one side of the cavity and having its face engaging the side faces of said impellers; and a drive shaft connected to drive one of said impellers and extending outward from said housing through an opening in said wear plate the improvement which comprises a counterbore formed into said opening from its gear-engaging face; an annular seal plate received in said opening, and having a flange received in the counterbore, the outer periphery of the flange on the annular seal plate lying entirely within the trace of the roots of the teeth on the impeller; a sealing face formed on the side of the seal plate engaging the side face of the impeller; sealing means effective to prevent leakage from said counterbore through said opening; and means biasing said seal plate into engagement with the side face of the impeller.

2. In a gear pump of the type including a housing having an impeller cavity therein, inter-engaging impellers in the cavity, a drive shaft journalled in the housing and carrying one of said impellers, and two wear plates engaging the side faces of said impellers, said shaft extending outward through an opening in at least one of said wear plates; the improvement comprising a counterbore formed in said opening from the face next to said impeller; a flanged annular seal plate received in said opening, the flange thereon being received in said counterbore and axially shorter than said counterbore; endless resilient sealing means retained in said counterbore between said flange and a shoulder formed at the inner end of the counterbore, and compressed between the annular seal plate and said counterbore whereby the flanged end of the seal plate is urged into sealing contact with the side face of the gear.

3. The combination defined in claim 2 in which said sealing means has a circumferential groove formed therein, which opens toward the corner formed by the flange and the counterbore.

4. In a gear pump of the type including a housing having two end sections and a central section with an impeller cavity formed in said central section, a pair of wear plates confined between the opposite side faces of said central section and the corresponding end sections and closing the sides of said impeller cavity, a pair of shafts each having opposite ends journalled in the opposite end sections, said shafts being parallel with one another, a pair of inter-engaging gear impellers, one carried by each of said shafts, the side faces of the gears engaging wear surfaces of the wear plates, and said shafts extending through openings in said wear plates, the improvement which comprises counterbores formed into each of said openings from its gear-engaging face, an annular seal plate received in each of said openings, and having a flange received in the counterbore, the outer periphery of the flange lying entirely within the trace of the roots of the teeth on the impellers; a sealing face formed on the side of each seal plate which engages the side face of an impeller; sealing means effective to prevent leakage from said counterbore through said openings; and means biasing said seal plates into engagement with the side faces of the impellers.

References Cited by the Examiner
UNITED STATES PATENTS

| | | | |
|---|---|---|---|
| 2,044,873 | 6/1936 | Beust | 103—126 |
| 2,527,941 | 10/1950 | Lauck et al. | 103—126 |
| 2,809,592 | 10/1957 | Miller et al. | 103—126 |
| 3,153,371 | 10/1964 | Miller | 103—126 |
| 3,156,191 | 11/1964 | Lauck | 103—216 |
| 3,170,408 | 2/1965 | Hill et al. | 103—126 |
| 3,173,374 | 3/1965 | Beimfohr | 103—126 |

MARK NEWMAN, *Primary Examiner.*

W. J. GOODLIN, *Assistant Examiner.*